(12) United States Patent  
Sullivan, II

(10) Patent No.: US 7,341,004 B2
(45) Date of Patent: Mar. 11, 2008

(54) RAIL TRANSPORTATION SYSTEM AND METHOD OF CONSTRUCTING SAME

(75) Inventor: Ennis Cornelius Sullivan, II, Allen, TX (US)

(73) Assignee: FasTran Transit, Inc., Wilmington, DE (US)

( * ) Notice: Subject to any disclaimer, the term of this patent is extended or adjusted under 35 U.S.C. 154(b) by 337 days.

(21) Appl. No.: 11/148,730

(22) Filed: Jun. 9, 2005

(65) Prior Publication Data

US 2006/0278121 A1 Dec. 14, 2006

(51) Int. Cl.
*B61B 13/04* (2006.01)

(52) U.S. Cl. ..................... 104/118; 105/141

(58) Field of Classification Search ................ 104/118, 104/120, 121; 105/141, 144, 145, 146, 147
See application file for complete search history.

(56) References Cited

U.S. PATENT DOCUMENTS 3,168,875 A 2/1965 Reed
3,190,235 A 6/1965 Bertin et al.
3,198,139 A 8/1965 Dark
3,286,651 A 11/1966 Dahl, Jr.
3,319,581 A 5/1967 Churchman et al.
3,865,040 A 2/1975 Steen
3,890,904 A * 6/1975 Edwards ..................... 104/121
3,985,081 A 10/1976 Sullivan, II
5,193,767 A 3/1993 Mihirogi

FOREIGN PATENT DOCUMENTS

FR 1253735 1/1961

OTHER PUBLICATIONS

Office Action issued by Examiner Robert J. McCarry, Jr. of the U.S. Patent and Trademark Office, in U.S. Appl. No. 11/119,874, mailed Jul. 12, 2007.

* cited by examiner

*Primary Examiner*—S. Joseph Morano
*Assistant Examiner*—Robert J. McCarry, Jr.
(74) *Attorney, Agent, or Firm*—Haynes and Boone, LLP

(57) ABSTRACT

A transportation system including two spaced parallel guide ways on which tracks are mounted for receiving vehicles. At least one beam extends between the guide ways for absorbing torsional forces caused by the composite centers of gravity of the vehicles being offset from the tracks.

15 Claims, 5 Drawing Sheets

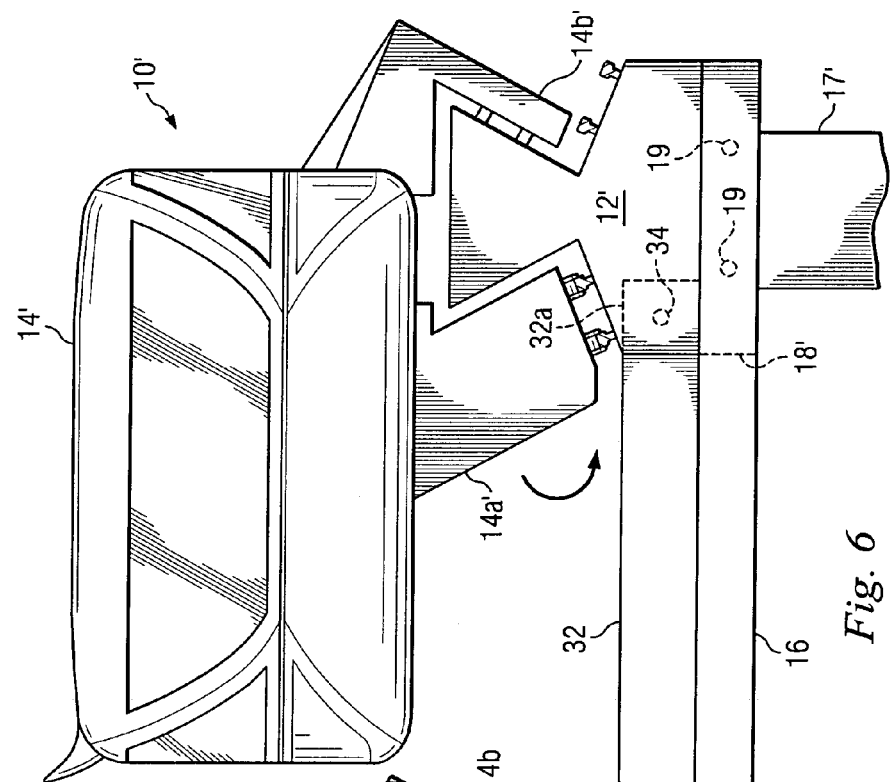
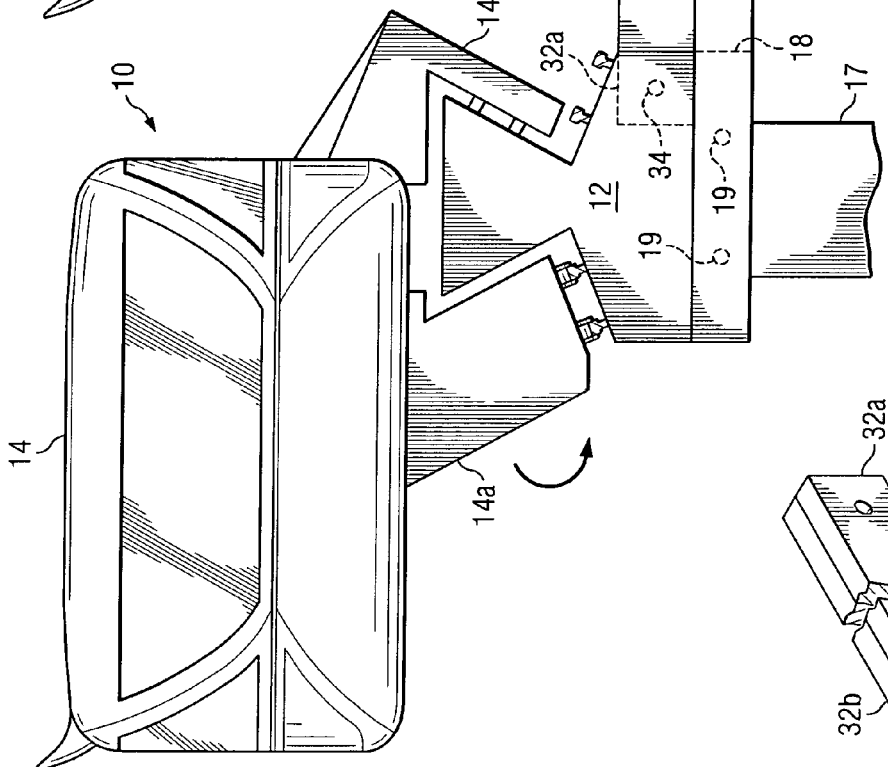

RAIL TRANSPORTATION SYSTEM AND METHOD OF CONSTRUCTING SAME

BACKGROUND

This invention relates to a transportation system, and method of constructing same, in which a plurality of vehicles travel along two spaced, parallel guide ways.

Public transportation systems, including monorail systems, two-track systems, magnetic levitation systems, etc., are becoming increasingly important as the population of urban areas continues to grow and automobile fuel prices continue to rise. It is important that public transportation systems be economically feasible, yet be large enough to transport a substantial amount of people yet maintain their stability during all operating conditions.

According to most prior designs, a vehicle, or series of interconnected vehicles, move over a track, or guide way, and the design is such that the center of gravity of each vehicle, even when it is loaded with passengers, baggage, etc., and subjected to external dynamic forces, is located within an area defined within the track or guide way to insure that the vehicle maintains adequate stability during all operating conditions. Therefore, in these arrangements, the width of each vehicle, and therefore its capacity, must be kept at relatively low values, which severely restricts the load or passenger-carrying ability of the vehicle.

Applicant's co-pending application Ser. No. 11/086,938, filed Mar. 22, 2005, addresses this problem by disclosing a vehicle that has a center of gravity that is laterally spaced from the tracks on a guide way. A range of possible locations of the center of gravity in both the longitudinal and lateral directions of the vehicle can be established thus enabling the vehicles to be designed with a much greater width, and therefore capacity, when compared to standard systems. The disclosure of this application is incorporated by reference.

The present application represents a further improvement of the rail transportation system disclosed in the above application, by providing two parallel guide ways, each of which is adapted to accommodate one or more vehicles while absorbing torque generated by the above offset location of the center of gravity of the vehicles.

BRIEF DESCRIPTION OF THE DRAWINGS

FIG. 4 is an exploded isometric view of a component of the system of FIG. 1.

FIGS. 5-8 are front elevational views of alternate embodiments of the invention.

DETAILED DESCRIPTION

Figure 1:
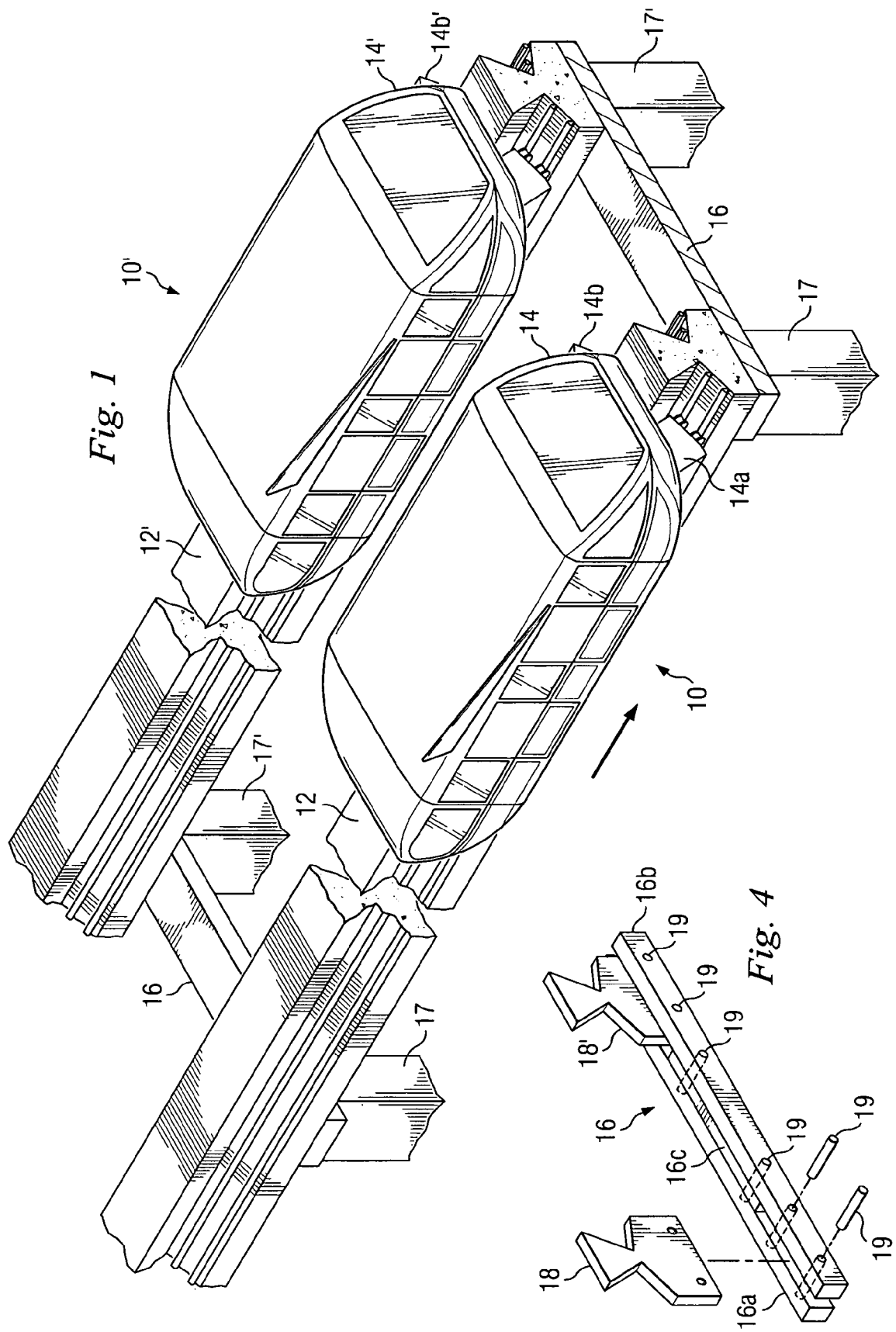
FIG. 1 is an isometric view of a rail transportation system according to an embodiment of the present invention.
Figure 2:
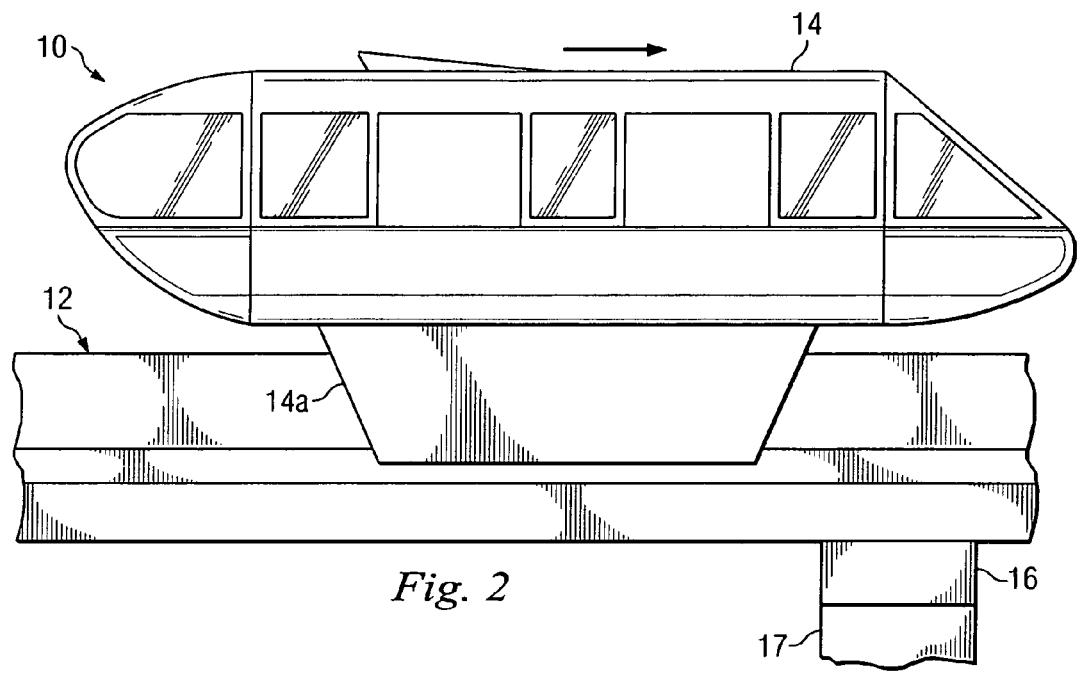
FIG. 2 is a side elevational view of a portion of the embodiment of FIG. 1.

Referring to FIGS. 1 and 2 of the drawings, the reference numeral 10 refers, in general, to a vehicle that moves along a guide way. The vehicle consists of a cabin 14, a housing 14a that extends from the cabin 14 to one side of the guide way 12, and a support arm 14b that extends from the cabin 14 to the other side of the guide way. The housing 14a and the arm 14b support the cabin 14 relative to the guide way 12 in a manner to be described. The housing 14a and the arm 14b can be connected to the cabin 14 in any conventional manner or can be formed integrally with the cabin.

Another vehicle 10' is provided that moves on a guide way 12' that extends parallel and proximate to the guide way 12. Since the vehicle 10' and the guide way 12' are identical to the vehicle 10 and the guide way 12, respectively, they will not be described in detail.

The guide ways 12 and 12' are supported in an elevated position by a cross beam 16 that extends below the guide ways with the lower surfaces of the guide ways abutting the upper surface of the beam. The beam 16 is supported in an elevated position by two columns 17 and 17' that are supported in the ground in a conventional manner. The guide ways 12 and 12', as well as the columns 17 and 17', can be formed of pre-stressed concrete poured over reinforcing rods, such as "rebars", and the beam 16 is constructed and connected to the guide ways 17 and 17' in a manner to be described.

It is understood that other assemblies, identical to the assembly consisting of the beam 16 and the columns 17 and 17', are axially spaced along the guide ways 12 and 12' at spaced intervals and one such assembly is shown in FIG. 1.

Both vehicles 10 and 10' are shown in FIG. 1 mounted on the guide way 12 in the same manner, i.e., with the front of each vehicle being shown. Thus, the vehicles 10 and 10' travel in a direction from left to right as shown in FIG. 2 in connection with the vehicle 10. It is understood, however, that one or both of the vehicles 10 and 10' can be removed from its corresponding guide way 12 and/or 12', and turned in the opposite direction before it is remounted on the guide way, using proper lifting equipment, a closed loop guide way with a switch, a turntable, or the like. Thus, several combinations of directions of travel of the vehicles 10 and 10' are possible.

Figure 3:
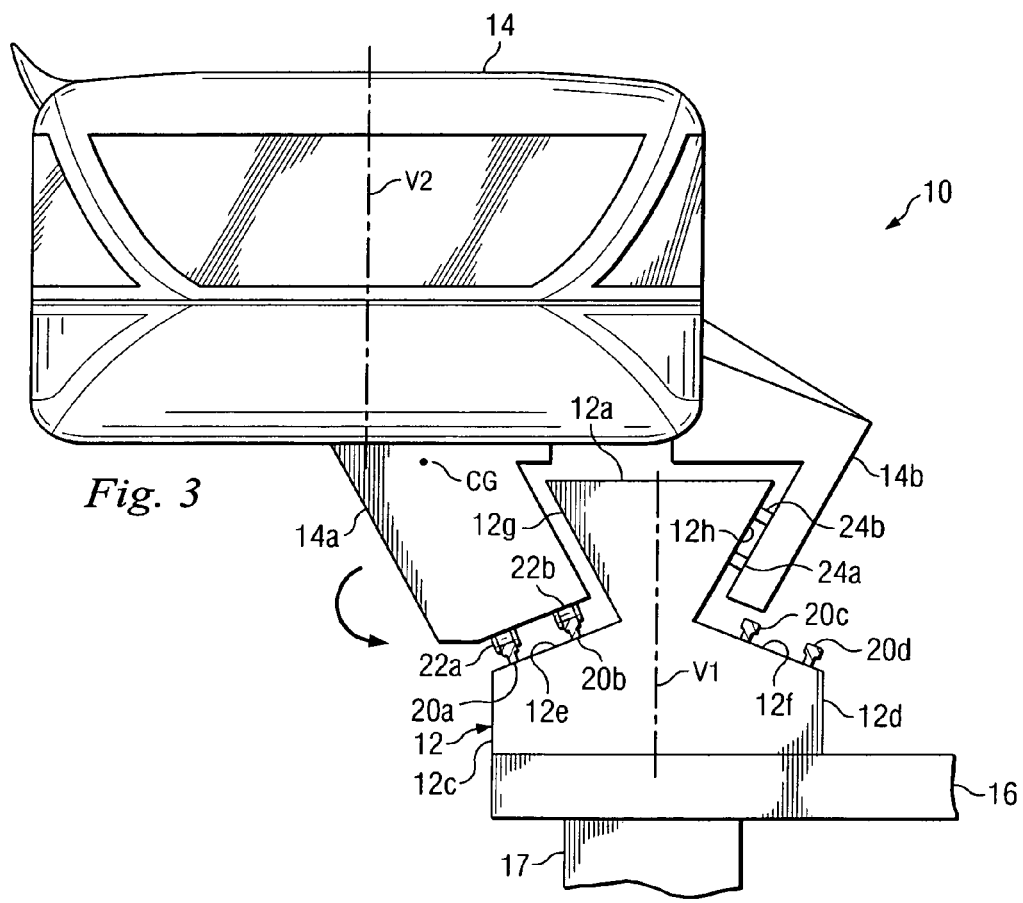
FIG. 3 is a front elevational view of a portion of the system of FIG. 1.

Referring to FIG. 3, the guide way 12 is symmetrical about its vertical axis V1 and includes a flat, horizontal, upper surface 12a and a flat lower surface 12b that is supported on the upper surface of the beam 16 in any known manner. Two vertical side surfaces 12c and 12d extend upwardly from the lower surface 12b, and two side surfaces 12e and 12f are angled inwardly from the side surfaces 12c and 12d, respectively. Two additional angled side surfaces 12g and 12h are angled outwardly from the surfaces 12e and 12f, respectively, and extend to the upper surface 12a. One end of the beam 24 abuts the side surface 12d and the other end of the beam abuts the corresponding surface of the guide way 12'.

The cabin 14 extends above the guide way 12, and the vertical axis V2 of the cabin 14 is laterally offset from the guide way 12 in a direction to the left as viewed in FIG. 3, for reasons to be described. The housing 14a and the arm 14b have angled outer surfaces that extend in a closely spaced, parallel, relation to the surfaces 12e and 12f, respectively, of the guide way 12.

A pair of laterally-spaced, longitudinally-extending rails, or tracks, 20a and 20b are mounted on the surface 12b of the guide way 12 in any conventional manner, and have curved upper surfaces. The tracks 20a and 20b are engaged by two corresponding wheels 22a and 22b that are rotatably mounted to the housing 14a in any conventional manner. The wheels 22a and 22b project a slight distance from the housing 14a, and extend perpendicular to the surface 12e. The outer circumferences of the wheels 22a and 22b are curved in cross section and extend over corresponding curved upper surfaces of the tracks 20a and 20b.

The wheels 22a and 22b are located in the front portion of the housing 14a, and it is understood that two additional wheels (not shown), identical to the wheels 22a and 22b, respectively, are located in the rear portion of the housing, and are adapted to engage the tracks 20a and 20b in a similar manner. Two additional tracks 20c and 20d are mounted on the guide way surface 12f for reasons that will be described.

The guide way surface 12h is engaged by two wheels 24a and 24b that are rotatably mounted to the distal end portion of the arm 14b in any conventional manner. The wheels 24a and 24b project a slight distance from the arm 14b and extend perpendicular to the surface 12h. The wheels 24a and 24b are not powered, and act as a counterbalance in a manner to be described. It is understood that two additional wheels (not shown), identical to the wheels 24a and 24b, respectively, are located in the rear portion of the arm.

Preferably, the wheels 22a and 22b are driven by an electric motor (not shown) disposed in the housing 14a which is connected to an electrical power source in a conventional manner. To this end, an electrical connecter (not shown) is mounted to the guide way 12, is connected to a source of electrical power, and maintains electrical contact with an electrical connector (not shown) on the vehicle 10 as the vehicle moves along the guide way 12 to transfer the electrical power to the motor in the housing 14a.

The motor drives the wheels 22a and 22b in a conventional manner at a speed determined by the speed of the motor, and the wheels propel the vehicle 10 along the tracks 20a and 20b in a direction indicated by the arrows in FIGS. 1 and 2. The other set of wheels located in the rear portion of the housing 14a are powered in the same manner.

The location of the composite center of gravity of the vehicle 10 in two planes (corresponding to the width and height of the vehicle) is shown in FIG. 3 by the reference letters CG. The CG is defined in the above-identified application and a method for determining a range of locations for the CG in these two planes, as well as along the longitudinal axis of the vehicle, is also disclosed in the latter application and this disclosure is incorporated by reference. In any case the location of the CG is laterally offset (to the left as viewed in FIG. 3) of the outer track 20a and the outer wheel 22a. It is understood that the specific location of the CG shown in FIG. 3 is for the purpose of example only and can vary with each application, but in all cases it will be laterally offset from the track 20a and the wheel 22a, in a direction to the left as viewed in FIG. 3.

The lateral and longitudinal offsets of the CG from the outer track 20a and the outer wheel 22a establishes forces that include a vertical, downwardly-directed component that is equal to the weight at the CG times the distance (moment arm) of the lateral offset and the distance of the above longitudinal offset. These vertical forces considerably add to the stability of the cabin 14 as it moves along the tracks 20a.

The offset centers of gravity of the vehicles 10 and 10' create rotational, or torsional forces, in the direction indicated by the curved arrow in FIG. 3 in connection with the vehicle 10. However, the beam 16 is designed with proper size, density and strength, and is tied to the guide ways 12 and 12' in a manner to be described, so that these forces are absorbed and any damage to the guide ways and the vehicles 10 and 10' is thus prevented.

To this end, and referring to FIG. 4, the beam 16 consists of two spaced elongated bars, or plates, 16a and 16b, preferably of steel. Two reinforcing plates 18 and 18', also preferably of steel, are embedded in the guide ways 12 and 12', respectively, but are shown sans the guide ways in FIG. 4. The plates 18 and 18' have a cross-sectional shape that substantially corresponds to the cross-sectional shape of the guide ways 12 and 12', with the exception that the lower end portion of each plate extends past the lower surfaces of the guide ways and into the spaces between the plates 16a and 16b. A center fill plate 16c extends in the space between the plates 16a and 16b not occupied by the extended portion of the reinforcing plates 18 and 18'.

A plurality of spaced, transversely-extending, tie bars 19 extend through corresponding aligned openings in the plates 16a and 16b and the plates 18 and 18', to tie the beam 16 to the guide ways 12 and 12'.

Figure 5:
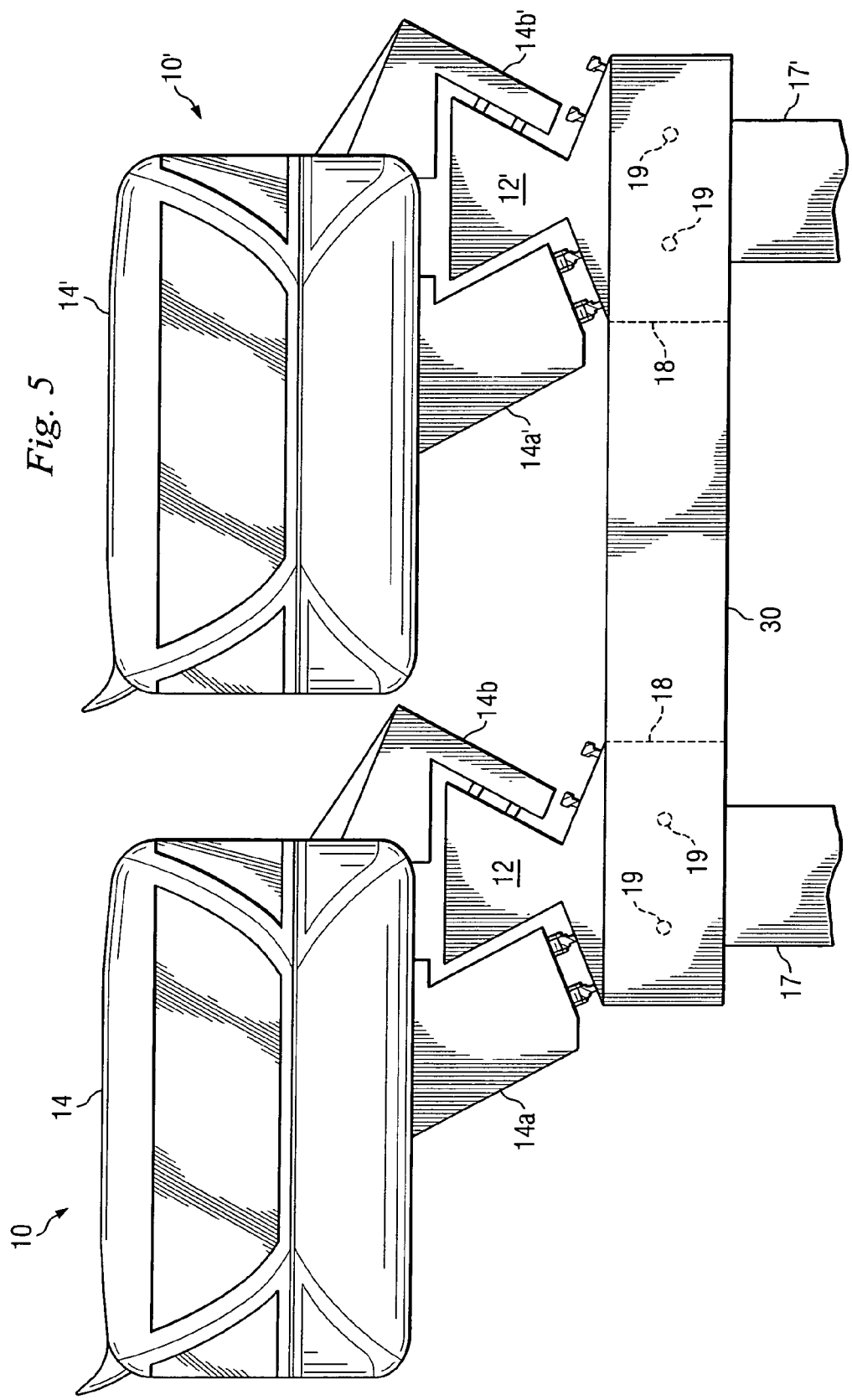

The embodiment of FIG. 5 is similar to that of the embodiment of FIGS. 1-4 and identical components are given the same reference numerals. According to the embodiment of FIG. 5, the vertical heights of the guide ways 12 and 12' are reduced and the beam 16 is replaced by a single beam 30 that is identical to the beam 16 with the exception that its thickness is greater than that of the beam 16, and, in the example shown, is approximately twice the thickness of the latter beam. The beam 30 can be formed in the same manner as the beam 16 and is connected to the guide ways 12 and 12' in the same manner as discussed above in connection with FIG. 4.

The embodiment of FIG. 6 is similar to that of the embodiment of FIGS. 1-4 and identical components are given the same reference numerals. According to the embodiment of FIG. 6, the beam 16 of the embodiment of FIGS. 1-4 is provided in the embodiment of FIG. 6 and is connected to the guide ways 12 and 12' in the manner disclosed above in connection with the embodiment of FIGS. 1-4. In addition, another beam 32 is provided that extends between the respective facing side surfaces of the guide ways 12 and 12', with a portion of the lower surface of the beam 32 abutting the corresponding upper surface portion of the beam 16.

As shown in FIG. 7, the beam 32 consists of two abutting plates 32a and 32b each of which has a length that is greater that the distance between the guide ways 12 and 12' so that the respective end portions of the plates extend in the guide ways and are tied to the plates 18 and 18' (FIG. 4) respectively, by one or more tie bars 34.

Figure 8:
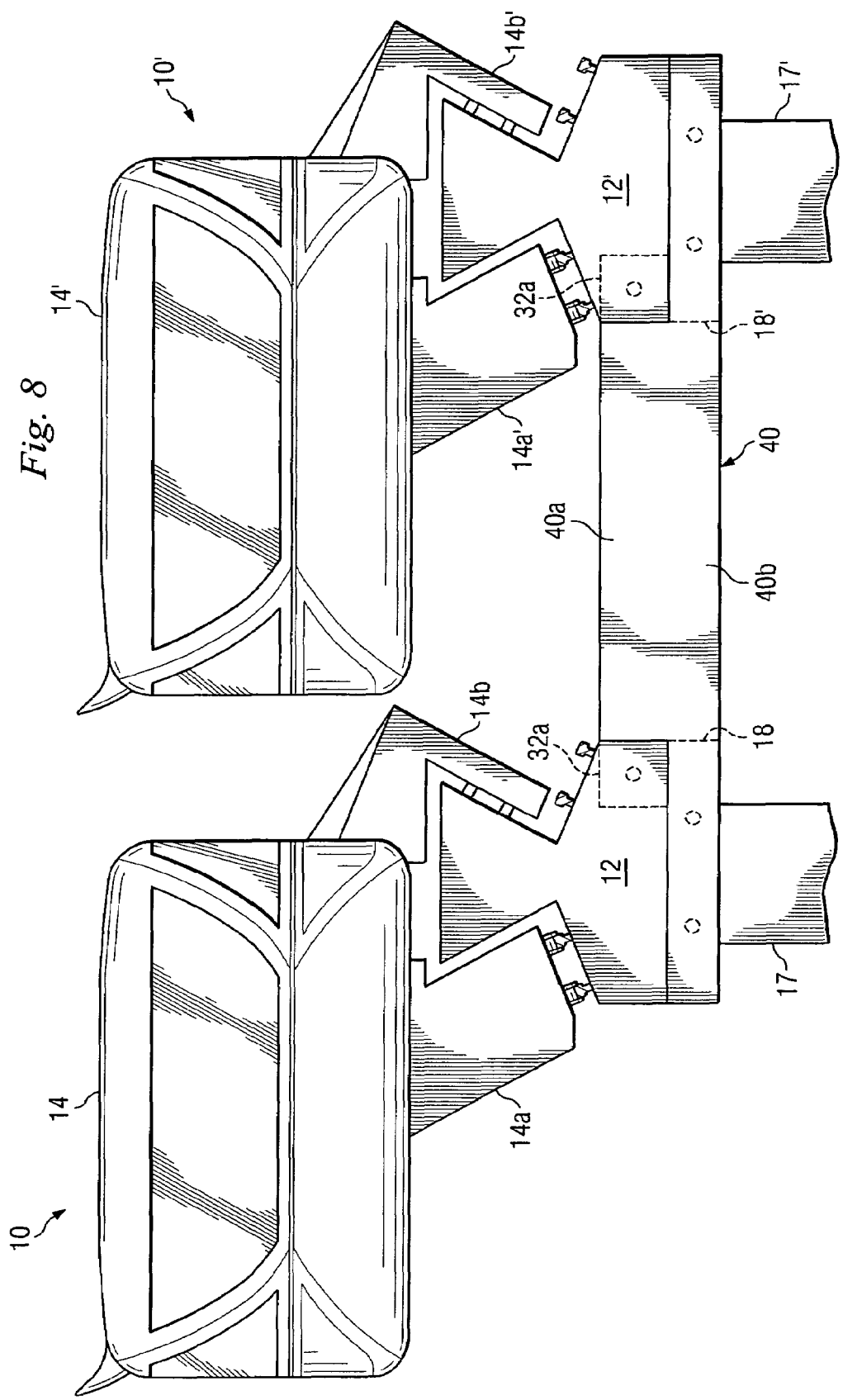

The embodiment of FIG. 8 is similar to that of the embodiment of FIG. 7 and identical components are given the same reference numerals. According to the embodiment of FIG. 8, a single beam 40 is provided that has an upper portion 40a that is identical to the beam 32 of the embodiment of FIG. 7, and a lower portion 40b that is identical to the beam 16 of the embodiment of FIGS. 1-4 and 7. Thus, the beam 40 is formed by integrating the beams 16 and 32 into one beam. The upper portion 40a of the beam 40 is connected to the guide ways 12 and 12' in the same manner as the beam 32 as described above in connection with the embodiments of FIGS. 6 and 7, and the lower portion 40b of the beam 40 is connected to the guide ways 12 and 12' in the same manner as the beam 16 as described above in connection with the embodiment of FIGS. 1-4. Thus, in this embodiment the plates 18a and 18b are tied to both the upper beam portion 40a and the lower beam portion 40b.

Several advantages result from the above and examples are as follows:

Since the preferred embodiment utilizes an electric motor, the energy savings realized by transporting a high volume of people, which otherwise could be using automobiles powered by internal combustion engines, is significant.

The torsional forces created by the above-mentioned offset CGs of the vehicles 10 and 10' are absorbed by the beams 16, 30, 32 and 40.

The guide ways and the vehicles discussed above can be easily elevated above the ground in the same right-of-way areas used by existing transportation systems, thus eliminating, or at least substantially reducing, the need for acquisition of new land space for the construction of the system.

In each of the above embodiments, the frusto-conical shape of the upper portion of the guide ways 12 and 12' defined by the surfaces 12a, 12g, and 12h, and the shape and positioning of the pertinent portions of the housing 14a and the arm 14b insure that the vehicles 10 and 10' will not come off of the guide ways 12 and 12', respectively.

The stabilizing forces discussed above will maintain the stability of the cabin 14 despite variances in dynamic loading on the vehicles caused by curved guide ways, wind conditions, etc.

The downwardly-directed forces equal to the weight at the CG times the distance (moment arm) of the lateral and longitudinal offsets discussed above considerably add to the stability of the cabin 14 as it moves along the tracks 20a-20d.

The stabilizing forces discussed above will maintain the stability of the cabin 14 despite variances in dynamic loading on the vehicles caused by curved guide ways, wind conditions, etc.

The increased stability of the vehicle 10 as it moves along the tracks 20a and 20b, as discussed above, enables a relatively wide cabin 14 to be utilized that holds a higher number of people than would otherwise be possible.

The wheels 22a and 22b, as well as the wheels 24a and 24b, extend perpendicular to the angled surfaces 12e and 12h which insures continuous contact and traction between the wheels and the track, while reducing the tendency for the cabin 14 to oscillate about its points of contact with the tracks 20a and 20b.

Several variations of the above embodiments may be made within the scope of the invention and examples are set forth below.

The beams 16, 30, 32 and 40 can be formed by pre-stressed concrete or in other conventional manners.

The beams 16, 30, 32 and 40 can be connected to the guide ways 12 and 12' in manners other than those disclosed above.

In the embodiment of FIG. 6, the beam 16 can be eliminated and the beam 32 can be the sole beam connecting the guide ways 12 and 12'.

Additional vehicles, identical to the vehicles 10 and 10', can be connected together in a conventional manner and that each additional vehicle would be designed in the same manner described above in connection with the vehicle 10.

The specific shape of the vehicles can be varied.

The tracks 20a and 20b can be eliminated and the wheels 22a and 22b can directly engage the surface 12e of the guide way 12.

The number of plates making up the beams 16, 30, 32, and 40 can be varied.

The number of tracks and the number of wheels engaging the tracks can be varied.

The specific design of the guide ways can be varied as long as the above advantages are achieved.

The number and type of wheels of the vehicles engaging the guide ways can be varied.

Other modes of power may be used to propel the drive wheels 22a and 22b.

Power may be supplied to the wheels 24a and 24b.

Those skilled in the art will readily appreciate that many other variations and modifications of the embodiment described above may be made without materially departing from the novel teachings and advantages of this invention. Accordingly, all such variations and modifications are intended to be included within the scope of this invention as defined in the following claims. In the claims, means-plus-function clauses are intended to cover the structures described herein as performing the recited function and not only structural equivalents, but also equivalent structures.

What is claimed is:

1. A transportation system comprising:
   a first guide way for receiving a first vehicle with the composite center of gravity of the vehicle being offset from the center of the guide way;
   a second guide way for receiving a second vehicle with the composite center of gravity of the vehicle being offset from the center of the guide way; and
   at least one beam connected between the two guide ways to absorb any torsional forces created by the first vehicle due to the offset center of gravity;
   wherein the beam extends below respective lower surfaces of the guide ways with the upper surface of the beam abutting the respective lower surfaces of the guide ways;
   wherein each of the guide ways comprises a plate that extends below the lower surface of the guide way, and the beam defines a space for receiving the respective extensions;
   wherein the system further comprises means for connecting the beam to the respective plates; and
   wherein each of the guide ways further comprises concrete in which the plate is embedded.

2. The system of claim 1 wherein the beam comprises two elongated plates that are spaced apart to define the space.

3. The system of claim 1 wherein the means comprises at least one bar extending through corresponding openings in the plate and the beam to tie the beam to the guide way.

4. A transportation system comprising:
   a first guide way for receiving a first vehicle with the composite center of gravity of the vehicle being offset from the center of the guide way;
   a second guide way for receiving a second vehicle with the composite center of gravity of the vehicle being offset from the center of the guide way;
   at least one beam connected between the two guide ways to absorb any torsional forces created by the first vehicle due to the offset center of gravity; and
   an additional beam extending between respective side surfaces of the guide ways;
   wherein each of the guide ways comprises a plate;
   wherein a portion of the additional beam extends into each of the guide ways and is connected to the respective plate; and
   wherein each of the guide ways further comprises concrete in which the plate is embedded, and wherein an end portion of the additional beam extends into the concrete.

5. The system of claim 4 further comprising at least one bar extending through corresponding openings in the plate and the additional beam to connect the additional beam to the plate.

6. A transportation system comprising:
   a first guide way for receiving a first vehicle with the composite center of gravity of the vehicle being offset from the center of the guide way;

a second guide way for receiving a second vehicle with the composite center of gravity of the vehicle being offset from the center of the guide way; and at least one beam connected between the two guide ways to absorb any torsional forces created by the first vehicle due to the offset center of gravity;

wherein there is a first beam that extends below respective lower surfaces of the guide ways with its upper surface abutting the lower surfaces of the guide ways and a second beam that extends between respective side surfaces of the guide ways; and wherein each of the guide ways comprises a plate that extends below a lower surface of the guide way, and wherein the first beam defines a space for receiving the extension, and further comprising means for connecting the beam to the plate.

7. The system of claim 6 wherein the first beam comprises two elongated plates that are spaced apart to define the space.

8. The system of claim 6 wherein the means comprises at least one bar extending through corresponding openings in the plate and the beam to tie the beam to the guide way.

9. The system of claim 6 wherein the guide way further comprises concrete in which the plate is embedded.

10. A transportation system comprising:

a first guide way for receiving a first vehicle with the composite center of gravity of the vehicle being offset from the center of the guide way;

a second guide way for receiving a second vehicle with the composite center of gravity of the vehicle being offset from the center of the guide way; and at least one beam connected between the two guide ways to absorb any torsional forces created by the first vehicle due to the offset center of gravity;

wherein there is a first beam that extends below respective lower surfaces of the guide ways with its upper surface abutting the lower surfaces of the guide ways and a second beam that extends between respective side surfaces of the guide ways; and wherein each of the guide ways comprises a plate, and wherein a portion of the second beam extends into the guide way and is connected to the plate.

11. The system of claim 10 wherein the guide way further comprises concrete in which the plate is embedded, and wherein an end portion of the second beam extends into concrete.

12. The system of claim 10 further comprising at least one bar extending through corresponding openings in the plate and the second beam to connect the second beam to the plate.

13. A transportation system comprising:

a first guide way for receiving a first vehicle with the composite center of gravity of the vehicle being offset from the center of the guide way;

a second guide way for receiving a second vehicle with the composite center of gravity of the vehicle being offset from the center of the guide way; and at least one beam connected between the two guide ways to absorb any torsional forces created by the first vehicle due to the offset center of gravity;

wherein there is one beam having a first portion that extends between respective side surfaces of the guide ways with its ends abutting the respective side surfaces; and a second portion that extends below respective lower surfaces of the guide ways with its upper surface abutting the respective lower surfaces of the guide ways.

14. A transportation system comprising:

a first guide way for receiving a first vehicle with the composite center of gravity of the vehicle being offset from the center of the guide way;

a second guide way for receiving a second vehicle with the composite center of gravity of the vehicle being offset from the center of the guide way; and at least one beam connected between the two guide ways to absorb any torsional forces created by the first vehicle due to the offset center of gravity;

wherein there is a first pair of wheels supported by the first vehicle and adapted to engage a first surface of the guide way and a second pair of wheels rotatably supported by the first vehicle and adapted to respectively engage a second surface of the first guide way.

15. The system of claim 14 wherein the first and second surfaces extend at an angle to the vertical and to the horizontal.

* * * * *